US012607446B2

(12) United States Patent
Yu et al.

(10) Patent No.: US 12,607,446 B2
(45) Date of Patent: Apr. 21, 2026

(54) SYSTEMS AND METHODS FOR IN-LINE MONITORING OF PROPERTIES OF A WEB DURING A MANUFACTURING PROCESS

(71) Applicant: GM GLOBAL TECHNOLOGY OPERATIONS LLC, Detroit, MI (US)

(72) Inventors: Xiaowei Yu, Farmington Hills, MI (US); Donghao Liu, Troy, MI (US); Robin James, Rochester Hills, MI (US); Ming Wang, Stering Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 177 days.

(21) Appl. No.: 18/774,906

(22) Filed: Jul. 16, 2024

(65) Prior Publication Data

US 2026/0022927 A1     Jan. 22, 2026

(51) Int. Cl.
| | |
|---|---|
| *G01R 27/08* | (2006.01) |
| *G01B 7/04* | (2006.01) |
| *H01M 4/04* | (2006.01) |

(52) U.S. Cl.
CPC .......... *G01B 7/042* (2013.01); *H01M 4/0435* (2013.01)

(58) Field of Classification Search
CPC ... G01B 7/042; H01M 4/0435; G01R 35/007; G01R 27/02; G01R 33/0023; G01R 33/0035; G01R 33/005; G01R 33/58; H04Q 9/00; G03G 15/00
See application file for complete search history.

(56) References Cited

U.S. PATENT DOCUMENTS

| | | | |
|---|---|---|---|
| 5,537,048 A | 7/1996 | Novak | |
| 9,740,145 B2 * | 8/2017 | Honda | G03G 15/1675 |
| 2006/0120749 A1 * | 6/2006 | Ahn | G03G 15/168 |
| | | | 399/101 |
| 2021/0356891 A1 * | 11/2021 | Koide | G03G 15/6558 |
| 2024/0308801 A1 * | 9/2024 | Ogata | B65H 7/06 |

FOREIGN PATENT DOCUMENTS

DE        102007052609 A1     5/2009

* cited by examiner

*Primary Examiner* — Thang X Le
(74) *Attorney, Agent, or Firm* — Ingrassia Fisher & Lorenz, LLP | IF&L

(57) ABSTRACT

Systems and methods are provided for monitoring properties of a web during a roll-to-roll manufacturing process. The methods may include moving the web past a first roller such that the web contacts the first roller, wherein the first roller includes a first contact strip formed of an electrically conductive material and extends circumferentially about the first roller, applying a voltage to the first contact strip while moving the web past the first roller, such that the voltage conducts through the web to a second contact strip, measuring the voltage received by the second contact strip, determining local resistance values relative to positions of the web based on the difference in the voltage applied to the first contact strip and the voltage received by the second contact strip, and determining at least one property of the web relative to the positions of the web based on the local resistance values.

20 Claims, 6 Drawing Sheets 420          470          412

900

SYSTEMS AND METHODS FOR IN-LINE MONITORING OF PROPERTIES OF A WEB DURING A MANUFACTURING PROCESS

INTRODUCTION

The technical field generally relates to roll-to-roll processes, and more particularly relates to systems and methods for in-line electronic property monitoring for quality control during roll-to-roll manufacturing of webs, such as certain electrode materials for electrochemical cells.

Electric vehicles (EVs) such as battery electric vehicles (BEVs), hybrid vehicles, and/or fuel cell vehicles include one or more electric machines and a battery system including one or more battery cells, modules and/or packs. A power control system is used to control charging and/or discharging of the battery system during charging and/or driving. EV manufacturers continuously aim to enhance power density of the battery cells to extend vehicle range, typically employing lithium-ion battery (LIB) cells due to their current suitability for high-power applications.

Accordingly, there is an ongoing desire for systems and methods capable of providing improved battery cells. Furthermore, other desirable features and characteristics of the present disclosure will become apparent from the subsequent detailed description and the appended claims, taken in conjunction with the accompanying drawings and the foregoing introduction.

SUMMARY

A system is provided for monitoring of properties of a web during a roll-to-roll manufacturing process. In one example, the system includes a first roller configured to contact a first side of the web as the web travels thereby, wherein the first roller includes a first contact strip formed of an electrically conductive material and extending circumferentially about the first roller, a second roller configured to contact a second side of the web as the web travels thereby, wherein the first roller and the second roller are aligned relative to a through-plane of the web such that the web travels between the first roller and the second roller and is contacted by both the first roller and the second roller simultaneously, wherein the second roller includes a second contact strip formed of the electrically conductive material and extending circumferentially about the second roller, wherein the first contact strip and the second contact strip are aligned relative to a through-plane of the web, and a measurement system functionally coupled with the first contact strip and the second contact strip, the measurement system configured to apply a voltage to the first contact strip of the first roller while the web travels thereby such that the voltage conducts through the web to the second contact strip of the second roller, measure the voltage received by the second contact strip, and determine local resistance values relative to positions of the web based on the difference in the voltage applied to the first contact strip and the voltage received by the second contact strip.

In various examples, the first roller of the system may include a first electrically conductive cylindrical body and a first insulative material disposed between the first electrically conductive cylindrical body and the first contact strip, wherein the second roller includes a second electrically conductive cylindrical body and a second insulative material disposed between the second electrically conductive cylindrical body and the second contact strip.

In various examples, the first roller of the system may include a first cylindrical body and the first contact strip is disposed within a first recess of the first cylindrical body such that radially outermost surfaces of the first contact strip are flush with radially outermost surfaces of the first cylindrical body adjacent to the first contact strip, wherein the second roller includes a second cylindrical body and the second contact strip is disposed within a second recess of the second cylindrical body such that radially outermost surfaces of the second contact strip are flush with radially outermost surfaces of the second cylindrical body adjacent to the second contact strip.

In various examples, the first roller and the second roller of the system may be calendering rollers configured to apply a pressure to the web during a calendering process.

In various examples, the measurement system of the system may be configured to determine at least one property of the web relative to the positions of the web based on the local resistance values.

A system is provided for monitoring of properties of a web during a roll-to-roll manufacturing process. In one example, the system includes a first roller configured to contact a first side of the web as the web travels thereby, wherein the first roller includes a first contact strip and a second contact strip each formed of an electrically conductive material and extending circumferentially about the first roller, wherein the first contact strip and the second contact strip are axially spaced apart on the first roller, a measurement system functionally coupled with the first contact strip and the second contact strip, the measurement system configured to apply a voltage to the first contact strip of the first roller while the web travels thereby such that the voltage conducts through the web to the second contact strip, measure the voltage received by the second contact strip, and determine local resistance values relative to positions of the web based on the difference in the voltage applied to the first contact strip and the voltage received by the second contact strip.

In various examples, the first roller of the system may include a first electrically conductive cylindrical body, a first insulative material disposed between the first electrically conductive cylindrical body and the first contact strip, and a second insulative material is disposed between the first electrically conductive cylindrical body and the second contact strip.

In various examples, the first roller of the system may include a first cylindrical body, the first contact strip is disposed within a first recess of the first cylindrical body, and the second contact strip is disposed within a second recess of the first cylindrical body, wherein radially outermost surfaces of the first contact strip and the second contact strip are flush with radially outermost surfaces of the first cylindrical body.

In various examples, the first roller of the system may be a guide roller configured to maintain an alignment or a position of the web.

In various examples, the measurement system of the system may be configured to determine at least one property of the web relative to the positions of the web based on the local resistance values.

In various examples, the system may include a second roller configured to contact the first side of the web as the web travels thereby, wherein the second roller includes a third contact strip formed of the electrically conductive material and extending circumferentially about the second roller, and a third roller configured to contact a second side of the web as the web travels thereby, wherein the second roller and the third roller are aligned relative to a through-plane of the web such that the web travels between the second roller and the third roller and is contacted by both the second roller and the third roller simultaneously, wherein the third roller includes a fourth contact strip formed of the electrically conductive material and extending circumferentially about the third roller, wherein the third contact strip and the fourth contact strip are aligned relative to a through-plane of the web. The measurement system may be functionally coupled with the third contact strip and the fourth contact strip, wherein the measurement system is configured to apply a voltage to the third contact strip of the second roller while the web travels thereby such that the voltage conducts through the web to the fourth contact strip of the third roller, measure the voltage received by the fourth contact strip, and determine local through-plane resistance values relative to the positions of the web based on the difference in the voltage applied to the third contact strip and the voltage received by the fourth contact strip.

A method is provided for monitoring properties of a web during a roll-to-roll manufacturing process. In one example, the method may include moving the web through a station that includes a first roller such that the web contacts the first roller, wherein the first roller includes a first contact strip formed of an electrically conductive material and extending circumferentially about the first roller, applying a voltage to the first contact strip of the first roller while moving the web through the station, such that the voltage conducts through the web to a second contact strip, measuring the voltage received by the second contact strip, determining local resistance values relative to positions of the web based on the difference in the voltage applied to the first contact strip and the voltage received by the second contact strip, and determining at least one property of the web relative to the positions of the web based on the local resistance values.

In various examples, the second contact strip of the method may extend circumferentially about a second roller, wherein the method may include positioning the second roller in contact with the web directly opposite the first roller such that the web travels between the first roller and the second roller while the first roller and the second roller apply a pressure on the web, and such that the first contact strip and the second contact strip are aligned, wherein determining the local resistance values may include determining through-plane resistance values of the web.

In various examples, the second contact strip may extend circumferentially about the first roller in a position that is axially spaced apart from the first contact strip, and determining the local resistance values may include determining in-plane resistance values of the web.

In various examples, the method may include generating a map showing the local resistance values at the positions of the web.

In various examples, the method may include detecting a defect in the web based on the local resistance values.

In various examples, the method may include determining uniformity of a coating on the web based on the local resistance values.

In various examples, the method may include detecting misalignment of a first coating on a first side of the web and a second coating on a second side of the web based on the local resistance values.

In various examples, the web of the method may be configured to be segmented to form a plurality of electrodes for electrochemical cells.

In various examples, the method may include monitoring, based on the local resistance values, lengths of portions of the web configured to define each of the plurality of electrodes upon subsequent segmentation of the web.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Briefly, systems and methods are provided herein for promoting quality control during roll-to-roll manufacturing of webs by in-line electronic property monitoring. The systems and methods will be discussed in reference to manufacturing electrodes for electrochemical cells. However, the systems and methods are not limited to such applications, and may be applicable to other applications such as sheet metal production, paper product production, various thin films, etc. Further, although the systems and methods herein are described in reference to determining local resistance values, the systems and methods may alternatively be used to determine local capacitance values.

Electrochemical cells (also referred to herein as battery cells) typically include a plurality of unit cells each including cathode and anode electrodes. The cathode electrodes include a cathode current collector and cathode electroactive material arranged on the cathode current collector. The anode electrodes include an anode current collector and anode electroactive material arranged on the anode current collector. Separators are arranged between pairs of the cathode electrodes and the anode electrodes. For lithium (Li) battery cells, a lithium metal anode may be formed on the anode current collector and used as an extra source of lithium (e.g., for prelithiation), for example, to improve the energy density while ensuring a sufficient battery life cycle.

Various processes may be used to produce electrodes for electrochemical cells. For example, electrode materials may be formed or deposited directly on a web such as a current collector foil at high production rates using roll-to-roll processes. The roll-to-roll processes may include various steps (and/or stations) including, for example, producing an electrode slurry, coating the web with the slurry and drying to form a coating layer thereon, calendering, and various other downstream processes such as laser notching, infrared drying, etc.

In some examples, the substrate of the web may comprise dense or porous foil made of a metallic material such as copper (Cu), nickel (Ni), titanium (Ti), stainless steel, or alloys thereof. In some examples, the substrate may comprise a non-metallic material such as carbon or a polymeric material. In some examples, the coating layer(s) (e.g., electrode material(s)) on the substrate may have a thickness in a range from 1 μm to 80 μm.

Figure 1:
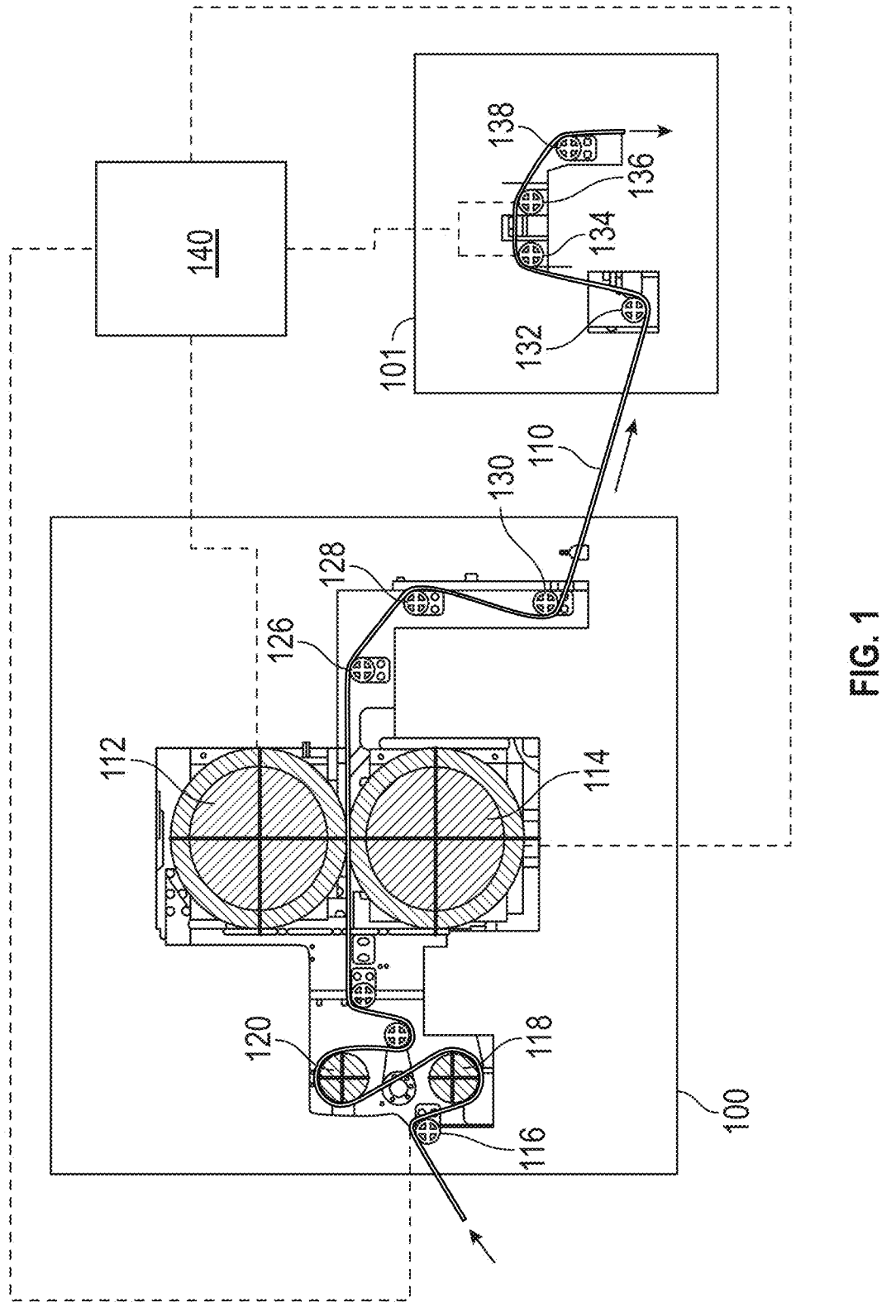
FIG. 1 schematically represents a portion of an exemplary roll-to-roll processing system that includes various stations for performing various processing steps on a web in accordance with an example.

Referring to FIG. 1, a portion of an exemplary roll-to-roll processing system includes various stations for performing various processing steps on a web 110. In this example, the illustrated portion includes a calendering station 100 that receives the web 110 from an upstream station (not shown) and a rewinding station 101 that provides the web 110 to a downstream station (not shown). Notably, the illustrated arrangement is merely exemplary, and the calendering station 100 and the rewinding station 101 may have various other configurations.

In this example, the web 110 may be processed while simultaneously being transported along various rollers. The calendering process may be performed, for example, to achieve desired properties of the web 110 and therefore the final product (e.g., a plurality of electrodes). Calendering rollers 112,114 may apply pressure, with or without heat, to compress the web 110 as it passes therebetween. Other rollers 116-138 represented in FIG. 1 may have various functions such as aligning the web 110, maintaining a desired tension of the web 110, etc.

To provide in-line electronic property monitoring of the web 110, one or more of the calendering rollers 112,114, the other rollers 116-138, or rollers associated with other stations of the roll-to-roll processing system (collectively referred to herein as the rollers) may include contact strips that are exposed at surfaces of the rollers and extend circumferentially thereabout. The contact strips are configured to physically contact the web 110 during processing thereof and, in combination with a measurement system 140 to be electrically coupled thereto, and to monitor local resistance values of the web 110. The contact strips may be formed from various electrically conductive materials, such as various metallic materials. In the example of FIG. 1, the measurement system 140 is functionally coupled with contact strips of the calendering rollers 112,114, and with some of the other rollers 116, 134, and 136. However, the measurements system 140 may be coupled with contact strips of fewer or more of the rollers.

Figure 2:
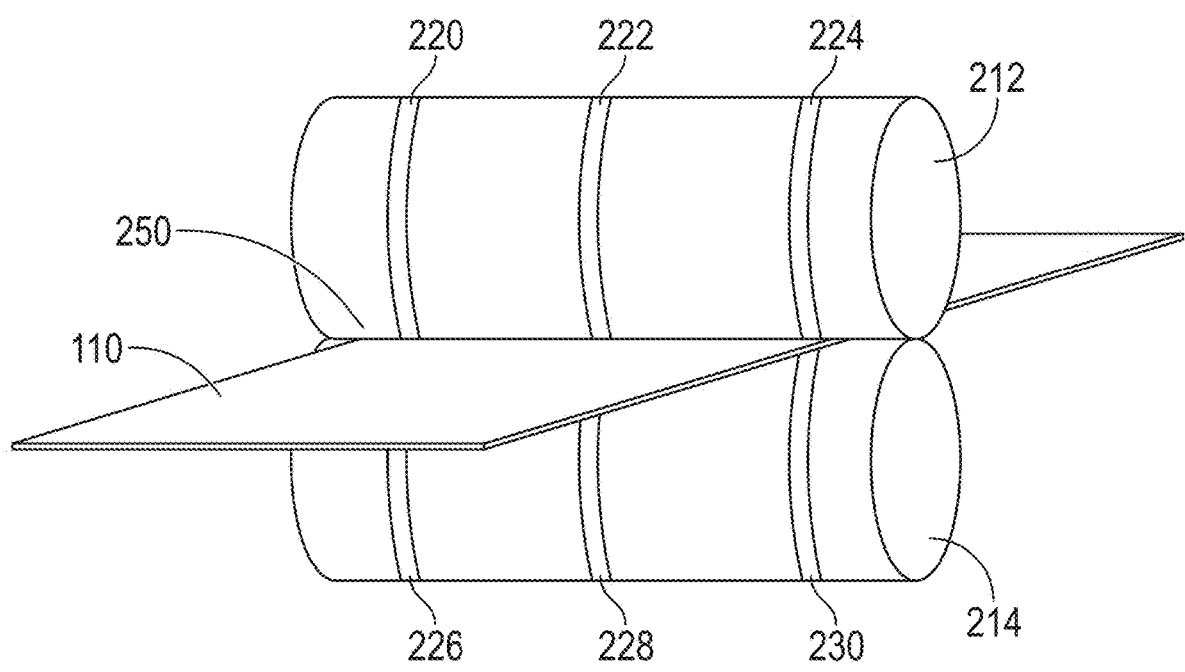
FIG. 2 is a perspective view of an exemplary pair of rollers of the roll-to-roll processing system of FIG. 1 having contact strips in accordance with an example.

FIG. 2 represents a first example that includes a pair of rollers, such as the calendering rollers 112,114, that are disposed on opposite sides of the web 110 and in contact therewith. In this example, the pair of rollers (also referred to as the first roller 212 and the second roller 214) each include three contact strips that are disposed opposite a corresponding contact strip from the other of the first and second rollers 212, 214. Specifically, the first roller 212 includes a first contact strip 220, a second contact strip 222, and a third contact strip 224, and the second roller 214 includes a fourth contact strip 226, a fifth contact strip 228, and a sixth contact strip 230. The first contact strip 220 and the fourth contact strip 226 are directly opposite one another with the web 110 therebetween to define a first measurement pair, the second contact strip 222 and the fifth contact strip 228 are directly opposite one another with the web 110 therebetween to define a second measurement pair, and the third contact strip 224 and the sixth contact strip 230 are directly opposite one another with the web 110 therebetween to define a third measurement pair. Each of the contact strips 220-230 are functionally coupled to the measurement system 140.

Figure 3:
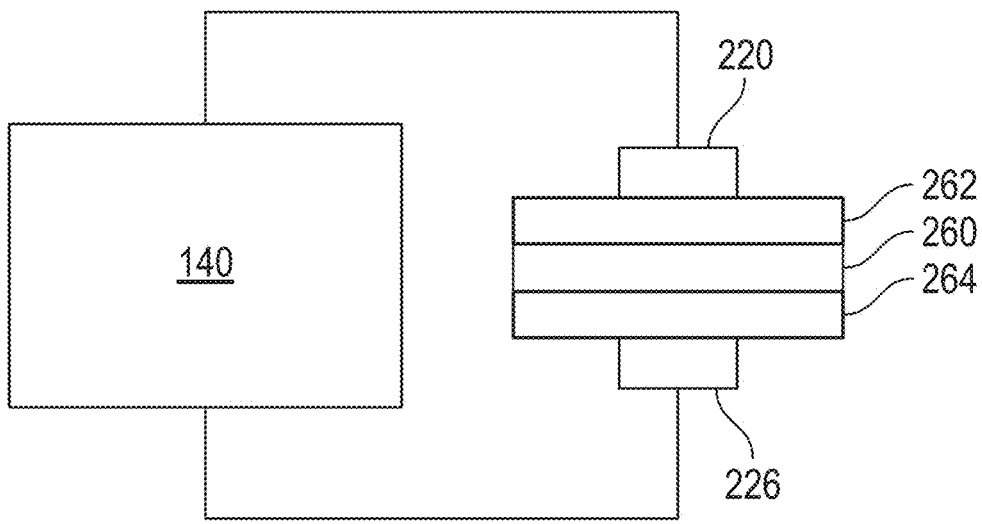
FIG. 3 schematically represents a cross-sectional view of a pair of the contact strips of FIG. 2 in contact with the web in accordance with an example.

FIG. 3 represents a partial cross-sectional view of a region within a box 250 of FIG. 2. As represented, the first measurement pair, defined by the first contact strip 220 and the fourth contact strip 226, are aligned on opposite sides of the web 110 and in contact therewith. In this example, the web 110 includes a substrate 260 with first and second electrode coatings 262, 264 deposited on opposite sides thereof. The second and third measurement pairs of FIG. 2 may have similar arrangements.

During operation, the measurement system 140 may apply a voltage between each of the first, second, and third measurement pairs through a thickness of the web 110 (i.e., through-plane). From this voltage, the measurement system 140 may determine through-plane resistance values mapped to positions on the web 110. The resistance values between the first, second, and third measurement pairs may be compared to each other, and/or may be compared to reference values. These through-plane resistance values may be used to monitor the quality of the web 110 in real-time).

Figure 4:
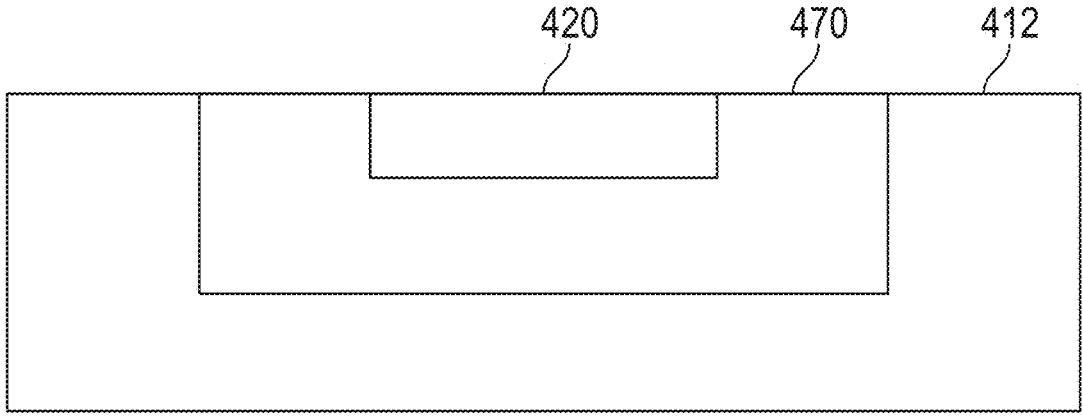
FIG. 4 schematically represents a partial cross-sectional view of one of the contact strips of FIG. 2 in accordance with an example.

In some examples, the contact strips are configured to have little to no impact on the processing of the web 110. To this end, the contact strips may be flush with adjacent surfaces of the rollers. For example, FIG. 4 represents a cross-sectional view of a portion of a contact strip 420 and adjacent surfaces of a roller 412. In this example, both the contact strip 420 and the roller 412 are conductive. For example, the contact strip 420 may be formed of metallic material or a conductive rubber material, and the roller 412 may be formed of a metallic material, such as stainless steel. In some examples, the contact strip 420 and the roller 412 may be formed of the same material. Since both are conductive, an insulation layer 470 formed of an insulating material is disposed between the contact strip 420 and the roller 412. The insulative material may be, for example, diamond, certain non-conductive ceramic materials, or a non-conductive polymeric material (e.g., polyurethane). Both the contact strip 420 and the insulation layer 470 include radially outermost surfaces that are flush with the adjacent radially outermost surfaces of the roller 412.

Figure 5:
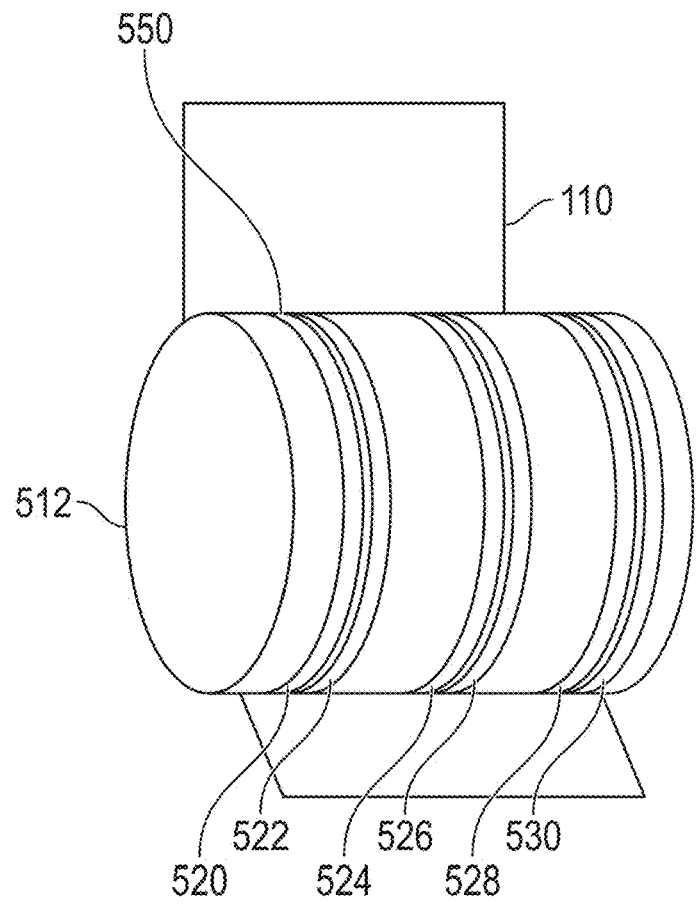
FIG. 5 is a perspective view of a roller of the roll-to-roll processing system of FIG. 1 having pairs of contact strips in accordance with an example.

FIG. 5 represents a second example that includes a roller 512, such as one of the other rollers 116-138 of FIG. 1, that is in contact with the web 110. In this example, the roller 512 includes six contact strips that are disposed in three axially spaced apart adjacent pairs. Specifically, the roller 512 includes first and second contact strips 520, 522 that define a first measurement pair, third and fourth contact strips 524, 526 that define a second measurement pair, and fifth and sixth contact strips 528, 530 that define a third measurement pair.

Figure 6:
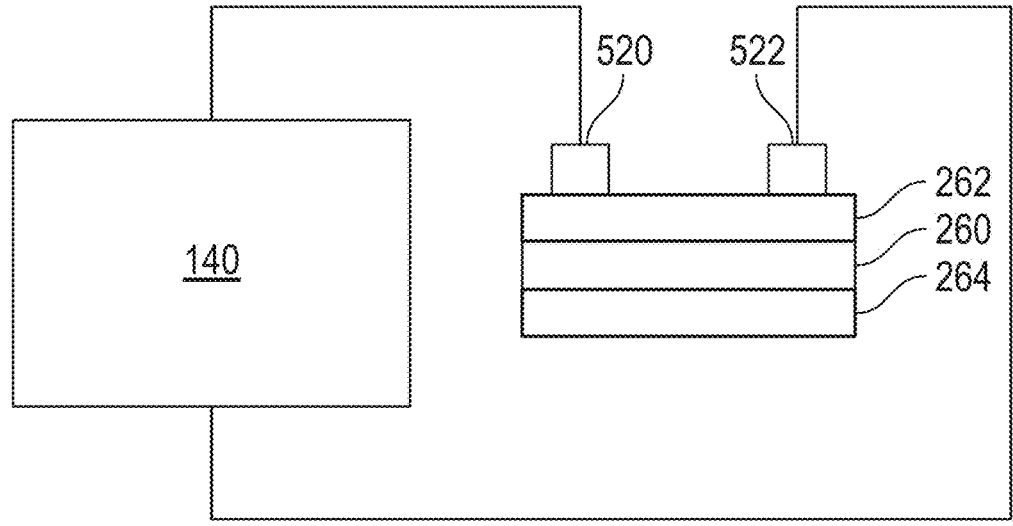
FIG. 6 schematically represents a cross-sectional view of a pair of the contact strips of FIG. 5 in contact with the web in accordance with an example.

FIG. 6 represents a partial cross-sectional view of a region within a box 550 of FIG. 5. As represented, the first measurement pair, defined by the first contact strip 520 and the second contact strip 522, are each in contact with the web 110 and functionally coupled to the measurement system 140. The second and third measurement pairs of FIG. 5 may have similar arrangements.

During operation, the measurement system 140 may apply a voltage between each of the first, second, and third measurement pairs through axial portions of the web 110 therebetween. From this voltage, the measurement system 140 may determine in-plane resistance values mapped to positions on the web 110, and these in-plane resistance values may be used to monitor the quality of the web 110 in real-time.

In this example, the roller 512 may be formed of an insulative material, such as certain insulative rubbers. As such, the contact strips 520-530 may be embedded within the roller 512 without an insulation layer therebetween.

In the first examples of FIGS. 2-4 and the second example of FIGS. 5-6, the local resistance values (through-plane, in-plane, or both) may be used for monitoring quality deviation across the web 110 and along the web 110. In addition, the resistance values may be for detection of defects in the web 110, such as contaminates, pinholes, agglomerations, etc., that change local resistance values. In some examples, electrode properties (e.g., bulk resistivity) may be considered to monitor coating uniformity based on the resistance values, and the relation between coating layer thickness and sheet resistance.

Figure 7:
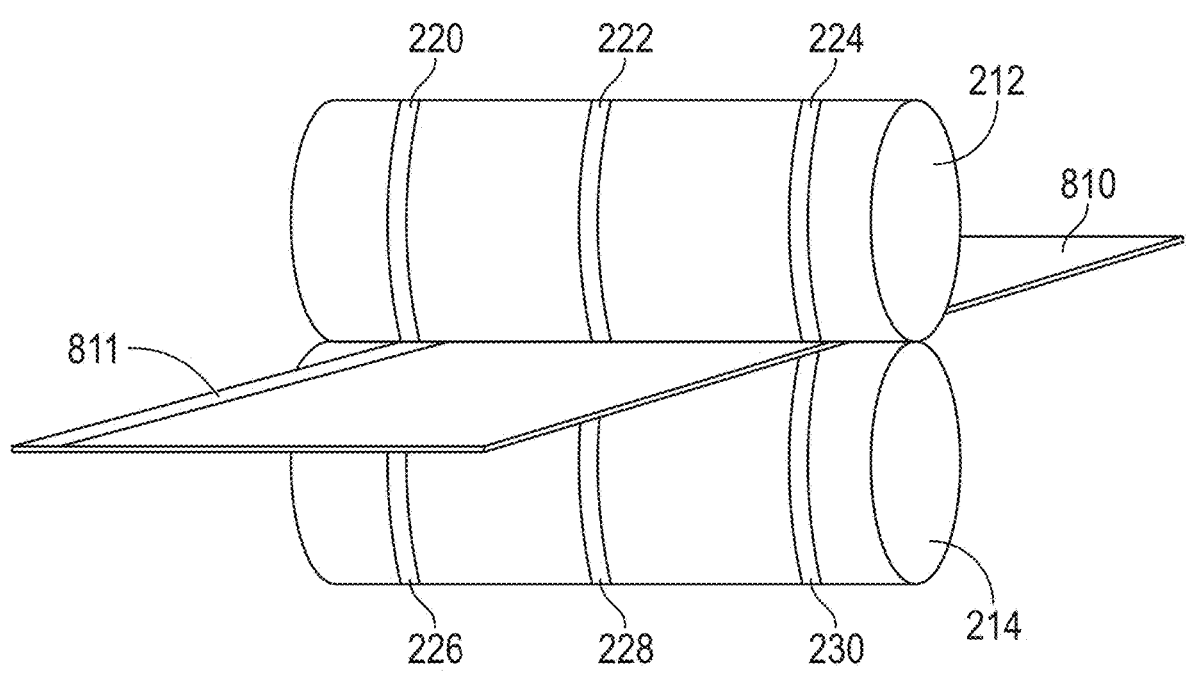
FIG. 7 is a perspective view illustrating the pair of rollers of FIG. 2 processing a web that includes a cathode insulation coating in accordance with an example.

The web may include various additional coatings or layers thereon. For example, FIG. 7 represents a web 810 configured to be segmented to form a plurality of electrodes for electrochemical cells that is being processed by the first and second rollers 212, 214. The web 810 includes a cathode insulation coating 811, that is, a dielectric coating, disposed along an edge of the web 810 on one or both sides thereof. In this example, the first contact strip 220 and the fourth contact strip 226 are configured to contact the cathode insulation coating 811 as the web 810 travels between the first and second rollers 212, 214. The measurement system 140 may determine local resistance values along the cathode insulation coating 811 to, for example, detect defects in the cathode insulation coating 811.

Figure 8:
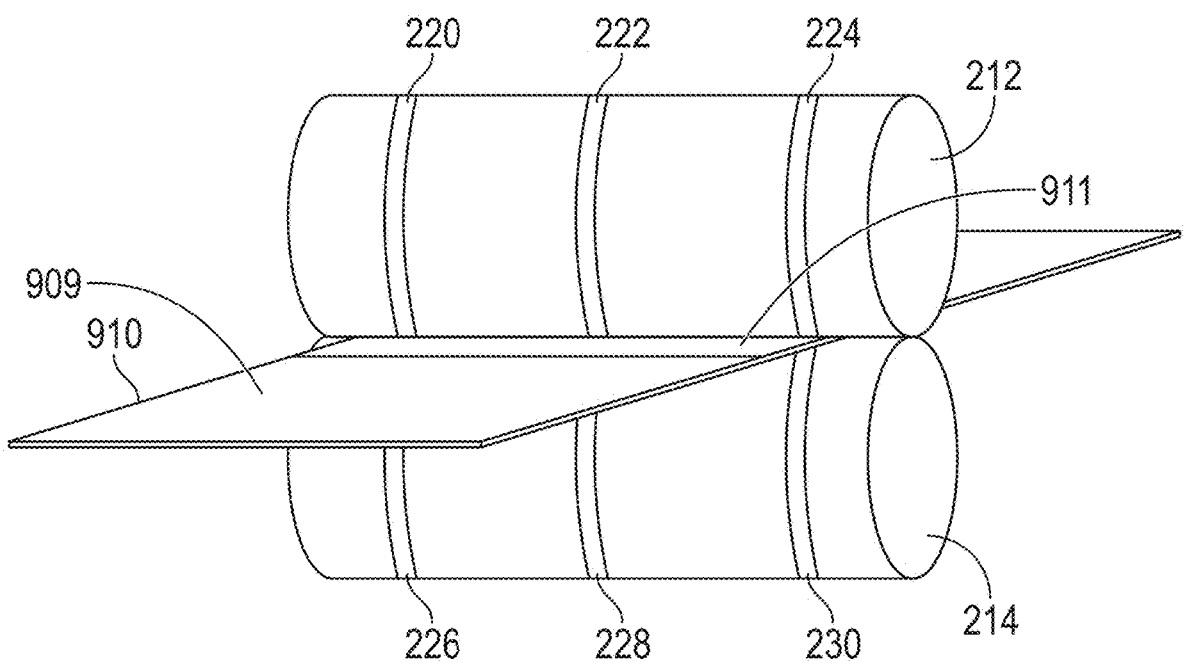
FIG. 8 is a perspective view illustrating the pair of rollers of FIG. 2 processing a web that includes patch coatings thereon in accordance with an example.

The web may include regions of uncoated substrate (e.g., foil). For example, FIG. 8 represents a web 910 having a patch coating or skip coating, that is, discrete coatings deposited over certain portions of the web with bare substrate therebetween. In this example, the web 910 includes coated portions 909 separated by uncoated portions 911 that extend across the web 910. The web 910 is being processed by the first and second rollers 212, 214. The local resistance values determined by the measurement system 140 may be used, for example, to determine edge quality of the coated portions 909, monitor lengths of the coated portions 909 along the web 910, detect misalignment of coated portions 909 deposited on opposite sides of the web 910, detect misshaped coated portions 909, and or detect damage to the substrate within the uncoated portions 911.

Figure 9:
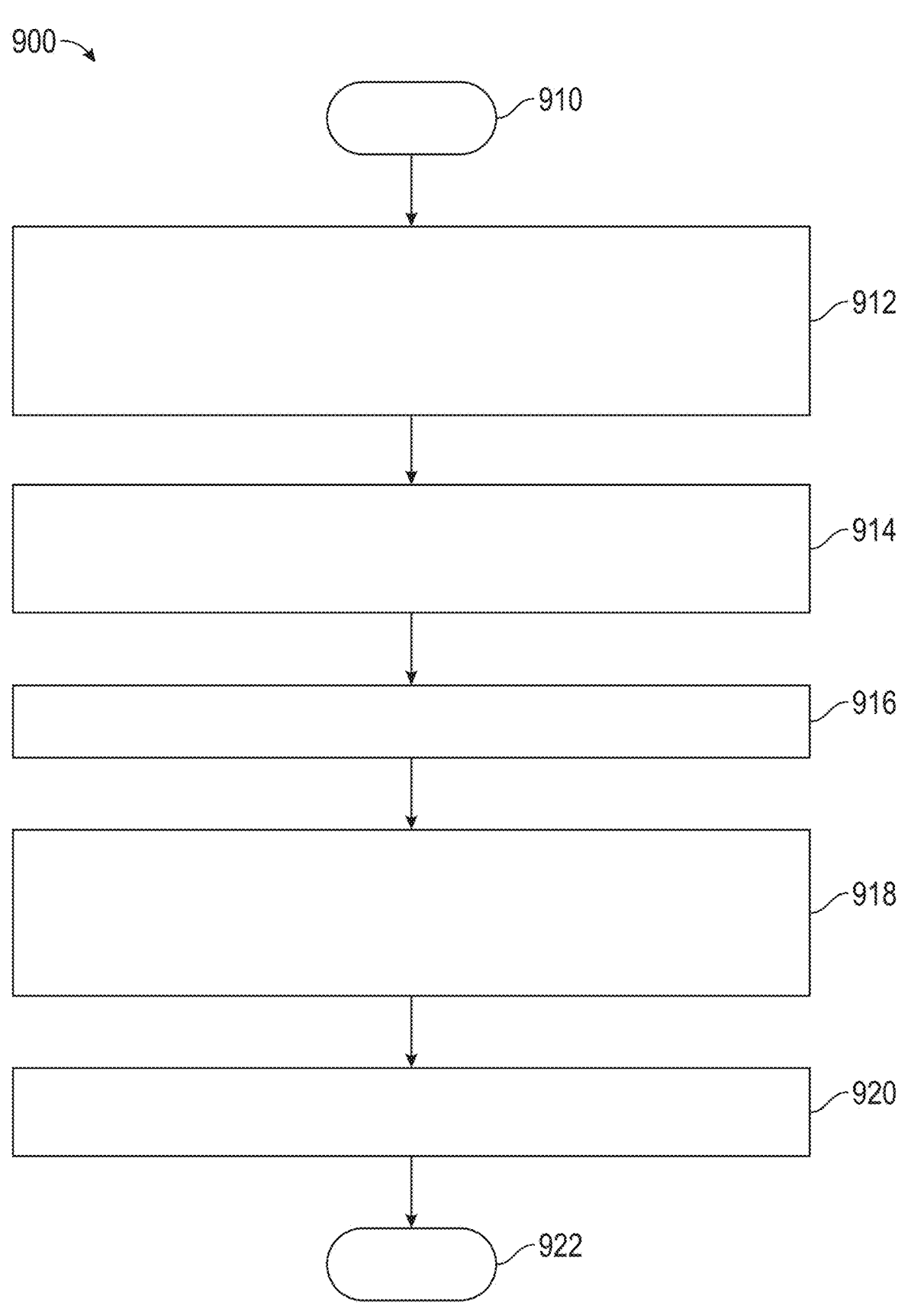
FIG. 9 is a flowchart illustrating a method for monitoring properties of a web during a manufacturing process in accordance with an example.

With reference now to FIG. 9 and with continued reference to FIGS. 1-8, a flowchart provides a method 900 for monitoring of properties of a web during a manufacturing process, in accordance with various examples. As can be appreciated in light of the disclosure, the order of operation within the method 900 is not limited to the sequential execution as illustrated in FIG. 9, but may be performed in one or more varying orders as applicable and in accordance with the present disclosure.

In one example, the method 900 may start at 910.

At 912, the method 900 may include moving the web through a station that includes a first roller such that the web contacts the first roller. The first roller includes a first contact strip formed of an electrically conductive material and extending circumferentially about the first roller.

At 914, the method 900 may include applying a voltage to the first contact strip of the first roller while moving the web through the station such that the voltage conducts through the web to a second contact strip.

At 916, the method 900 may include measuring the voltage received by the second contact strip.

At 918, the method 900 may include determining local resistance values relative to positions of the web based on the difference in the voltage applied to the first contact strip and the voltage received by the second contact strip.

At 920, the method 900 may include determining at least one property of the web relative to the positions of the web based on the local resistance values.

The method 900 may end at 922.

The method 900 may determine various properties of the web based on the local resistance values. As examples, the local resistance values may be used to detect a defect in the web, determine uniformity of a coating on the web, detect misalignment of a first coating on a first side of the web and a second coating on a second side of web, etc. In some examples, the web is configured to be segmented to form a plurality of electrodes for electrochemical cells, and the method may include monitoring, based on the local resistance values, lengths of portions of the web configured to define each of the electrodes upon subsequent segmentation of the web.

The systems and methods disclosed herein provide various benefits over certain existing systems and methods. For example, the local resistance values obtained by the measuring system may be used to determine in-line, real time properties of the web that may be used for quality control during manufacturing of various products, such as electrodes for electrochemical cells.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for monitoring of properties of a web during a roll-to-roll manufacturing process, comprising:

a first roller configured to contact a first side of the web as the web travels thereby, wherein the first roller includes a first contact strip formed of an electrically conductive material and extending circumferentially about the first roller;

a second roller configured to contact a second side of the web as the web travels thereby, wherein the first roller and the second roller are aligned relative to a through-plane of the web such that the web travels between the first roller and the second roller and is contacted by both the first roller and the second roller simultaneously, wherein the second roller includes a second contact strip formed of the electrically conductive material and extending circumferentially about the second roller, wherein the first contact strip and the second contact strip are aligned relative to a through-plane of the web;

a measurement system functionally coupled with the first contact strip and the second contact strip, the measurement system configured to:

apply a voltage to the first contact strip of the first roller while the web travels thereby such that the voltage conducts through the web to the second contact strip of the second roller;

measure the voltage received by the second contact strip; and determine local resistance values relative to positions of the web based on the difference in the voltage applied to the first contact strip and the voltage received by the second contact strip.

2. The system of claim 1, wherein the first roller includes a first electrically conductive cylindrical body and a first insulative material disposed between the first electrically conductive cylindrical body and the first contact strip, wherein the second roller includes a second electrically conductive cylindrical body and a second insulative material disposed between the second electrically conductive cylindrical body and the second contact strip.

3. The system of claim 1, wherein the first roller includes a first cylindrical body and the first contact strip is disposed within a first recess of the first cylindrical body such that radially outermost surfaces of the first contact strip are flush with radially outermost surfaces of the first cylindrical body adjacent to the first contact strip, wherein the second roller includes a second cylindrical body and the second contact strip is disposed within a second recess of the second cylindrical body such that radially outermost surfaces of the second contact strip are flush with radially outermost surfaces of the second cylindrical body adjacent to the second contact strip.

4. The system of claim 1, wherein the first roller and the second roller are calendering rollers configured to apply a pressure to the web during a calendering process.

5. The system of claim 1, wherein the measurement system is configured to determine at least one property of the web relative to the positions of the web based on the local resistance values.

6. A system for monitoring of properties of a web during a roll-to-roll manufacturing process, comprising:

a first roller configured to contact a first side of the web as the web travels thereby, wherein the first roller includes a first contact strip and a second contact strip each formed of an electrically conductive material and extending circumferentially about the first roller, wherein the first contact strip and the second contact strip are axially spaced apart on the first roller;

a measurement system functionally coupled with the first contact strip and the second contact strip, the measurement system configured to:

apply a voltage to the first contact strip of the first roller while the web travels thereby such that the voltage conducts through the web to the second contact strip;

measure the voltage received by the second contact strip; and determine local resistance values relative to positions of the web based on the difference in the voltage applied to the first contact strip and the voltage received by the second contact strip.

7. The system of claim 6, wherein the first roller includes a first electrically conductive cylindrical body, a first insulative material disposed between the first electrically conductive cylindrical body and the first contact strip, and a second insulative material disposed between the first electrically conductive cylindrical body and the second contact strip.

8. The system of claim 6, wherein the first roller includes a first cylindrical body, the first contact strip is disposed within a first recess of the first cylindrical body, and the second contact strip is disposed within a second recess of the first cylindrical body, wherein radially outermost surfaces of the first contact strip and the second contact strip are flush with radially outermost surfaces of the first cylindrical body.

9. The system of claim 6, wherein the first roller is a guide roller configured to maintain an alignment or a position of the web.

10. The system of claim 6, wherein the measurement system is configured to determine at least one property of the web relative to the positions of the web based on the local resistance values.

11. The system of claim 6, further comprising:

a second roller configured to contact the first side of the web as the web travels thereby, wherein the second roller includes a third contact strip formed of the electrically conductive material and extending circumferentially about the second roller;

a third roller configured to contact a second side of the web as the web travels thereby, wherein the second roller and the third roller are aligned relative to a through-plane of the web such that the web travels between the second roller and the third roller and is contacted by both the second roller and the third roller simultaneously, wherein the third roller includes a fourth contact strip formed of the electrically conductive material and extending circumferentially about the third roller, wherein the third contact strip and the fourth contact strip are aligned relative to a through-plane of the web;

wherein the measurement system is functionally coupled with the third contact strip and the fourth contact strip, wherein the measurement system is configured to:

apply a voltage to the third contact strip of the second roller while the web travels thereby such that the voltage conducts through the web to the fourth contact strip of the third roller;

measure the voltage received by the fourth contact strip; and determine local through-plane resistance values relative to the positions of the web based on the difference in the voltage applied to the third contact strip and the voltage received by the fourth contact strip.

12. A method for monitoring properties of a web during a roll-to-roll manufacturing process, comprising:

moving the web through a station that includes a first roller such that the web contacts the first roller, wherein the first roller includes a first contact strip formed of an electrically conductive material and extending circumferentially about the first roller;

applying a voltage to the first contact strip of the first roller while moving the web through the station, such that the voltage conducts through the web to a second contact strip;

measuring the voltage received by the second contact strip;

determining local resistance values relative to positions of the web based on the difference in the voltage applied to the first contact strip and the voltage received by the second contact strip; and determining at least one property of the web relative to the positions of the web based on the local resistance values.

13. The method of claim 12, wherein the second contact strip extends circumferentially about a second roller, wherein the method includes positioning the second roller in contact with the web directly opposite the first roller such that the web travels between the first roller and the second roller while the first roller and the second roller apply a pressure on the web, and such that the first contact strip and the second contact strip are aligned, wherein determining local resistance values includes determining through-plane resistance values of the web.

14. The method of claim 12, wherein the second contact strip extends circumferentially about the first roller in a position that is axially spaced apart from the first contact strip, wherein determining local resistance values includes determining in-plane resistance values of the web.

15. The method of claim 12, further comprising generating a map showing the local resistance values at the positions of the web.

16. The method of claim 12, further comprising detecting a defect in the web based on the local resistance values.

17. The method of claim 12, further comprising determining uniformity of a coating on the web based on the local resistance values.

18. The method of claim 12, further comprising detecting misalignment of a first coating on a first side of the web and a second coating on a second side of the web based on the local resistance values.

19. The method of claim 12, further comprising segmenting the web to form a plurality of electrodes for electrochemical cells.

20. The method of claim 19, further comprising monitoring, based on the local resistance values, lengths of portions of the web configured to define each of the plurality of electrodes upon subsequent segmentation of the web.

* * * * *